United States Patent
Takahashi

(10) Patent No.: US 8,823,752 B2
(45) Date of Patent: Sep. 2, 2014

(54) IMAGE PROCESSING SYSTEM

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 12/757,593

(22) Filed: Apr. 9, 2010

(65) Prior Publication Data

US 2010/0277508 A1 Nov. 4, 2010

(30) Foreign Application Priority Data

Apr. 30, 2009 (JP) .................................. 2009-110718
Mar. 24, 2010 (JP) .................................. 2010-068620

(51) Int. Cl.
*G09G 5/00* (2006.01)
*H04N 5/232* (2006.01)
*H04N 1/00* (2006.01)
*H04N 101/00* (2006.01)
*G06F 3/14* (2006.01)

(52) U.S. Cl.
CPC ...... *H04N 1/00249* (2013.01); *H04N 2201/001* (2013.01); *H04N 2201/0039* (2013.01); *G09G 2350/00* (2013.01); *H04N 2201/325* (2013.01); *H04N 1/0044* (2013.01); *H04N 1/00265* (2013.01); *H04N 1/00238* (2013.01); *H04N 1/00244* (2013.01); *H04N 2101/00* (2013.01); *G06F 3/14* (2013.01)
USPC ........................................ 345/667; 348/211.3

(58) Field of Classification Search
CPC ....................... H04N 1/00132; H04N 1/00127
USPC ..................................................... 348/211.3
See application file for complete search history.

(56) References Cited

U.S. PATENT DOCUMENTS 4,992,887 A * 2/1991 Aragaki ......................... 358/403
6,011,538 A * 1/2000 Eglit ............................. 345/667

(Continued)

FOREIGN PATENT DOCUMENTS

JP 2007-188238 7/2007
JP 2007188238 A * 7/2007

OTHER PUBLICATIONS

Pixmonix. ("Tutorial: Cropping Digital Images for Printing". Jun. 5, 2008. http://wayback.archive.org/web/20080605024559/http://www.pixmonix.com/tutorials/tutorial-cropping-for-printing.php).*
Phil Harvey, "ExifTool by Phil Harvey," Feb. 8, 2006. http://wayback.archive.org/web/20060208181821/http://www.sno.phy.queensu.ca/~phil/exiftool/, p. 1.*

(Continued)

*Primary Examiner* — Kee M Tung
*Assistant Examiner* — Nicholas R Wilson
(74) *Attorney, Agent, or Firm* — Cowan, Liebowitz & Latman, P.C.

(57) ABSTRACT

An image processing system in which a client apparatus transmits RAW image data to a server apparatus, receives a result developed by the server apparatus, and displays onto a display area. The client apparatus reduces the RAW image data to a size suitable to display, transmits to the server apparatus, and requests development processing. At this time, the client apparatus also starts transmission processing of original RAW image data to the server apparatus. While making adjustment of the development processing to reduced RAW image data, the client apparatus and the server apparatus also execute transmission and reception processing of the original RAW image data in parallel therewith. After the development processing of the reduced RAW image data, if there is a request from the client apparatus, the server apparatus also executes the development processing of the original RAW image data in a manner similar to the reduced RAW image data.

17 Claims, 19 Drawing Sheets

(56) References Cited

U.S. PATENT DOCUMENTS

| | | | |
|---|---|---|---|
| 6,583,799 B1* | 6/2003 | Manolis et al. | 715/838 |
| 7,706,011 B2* | 4/2010 | Sasaki | 358/1.15 |
| 7,970,240 B1* | 6/2011 | Chao et al. | 382/305 |
| 2005/0146621 A1* | 7/2005 | Tanaka et al. | 348/211.2 |
| 2008/0232658 A1* | 9/2008 | Sugaya et al. | 382/128 |
| 2008/0317431 A1* | 12/2008 | Mishima et al. | 386/52 |

OTHER PUBLICATIONS

Rong et al., "Extending the Lifetime of a Network of Battery-Powered Mobile Devices by Remote Processing: A Markovican Decision-based Approach," DAC '03 Proceedings of the 40th annual Design Automation Conference, Jun. 2-6, 2003, pp. 906-911.*

* cited by examiner

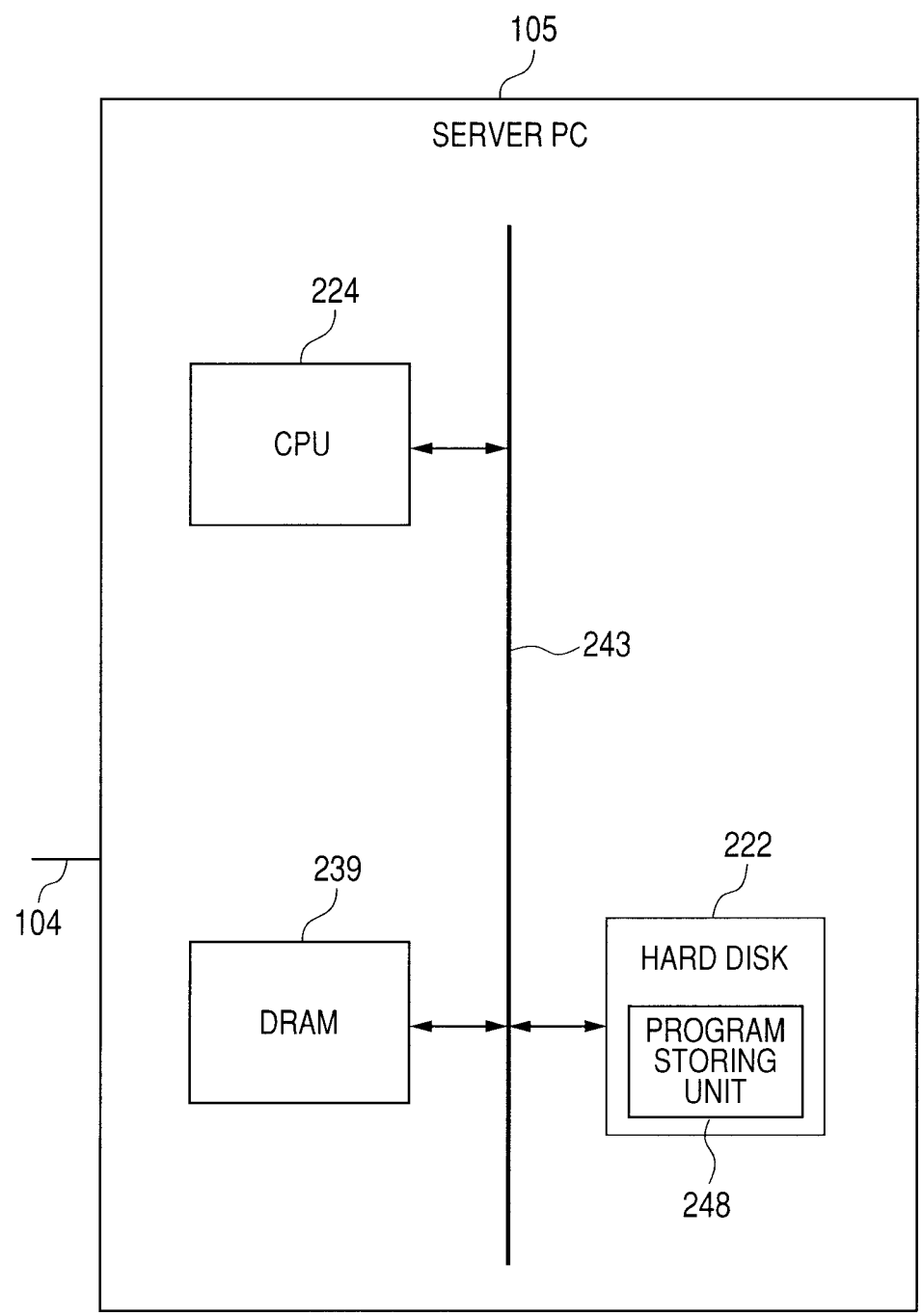

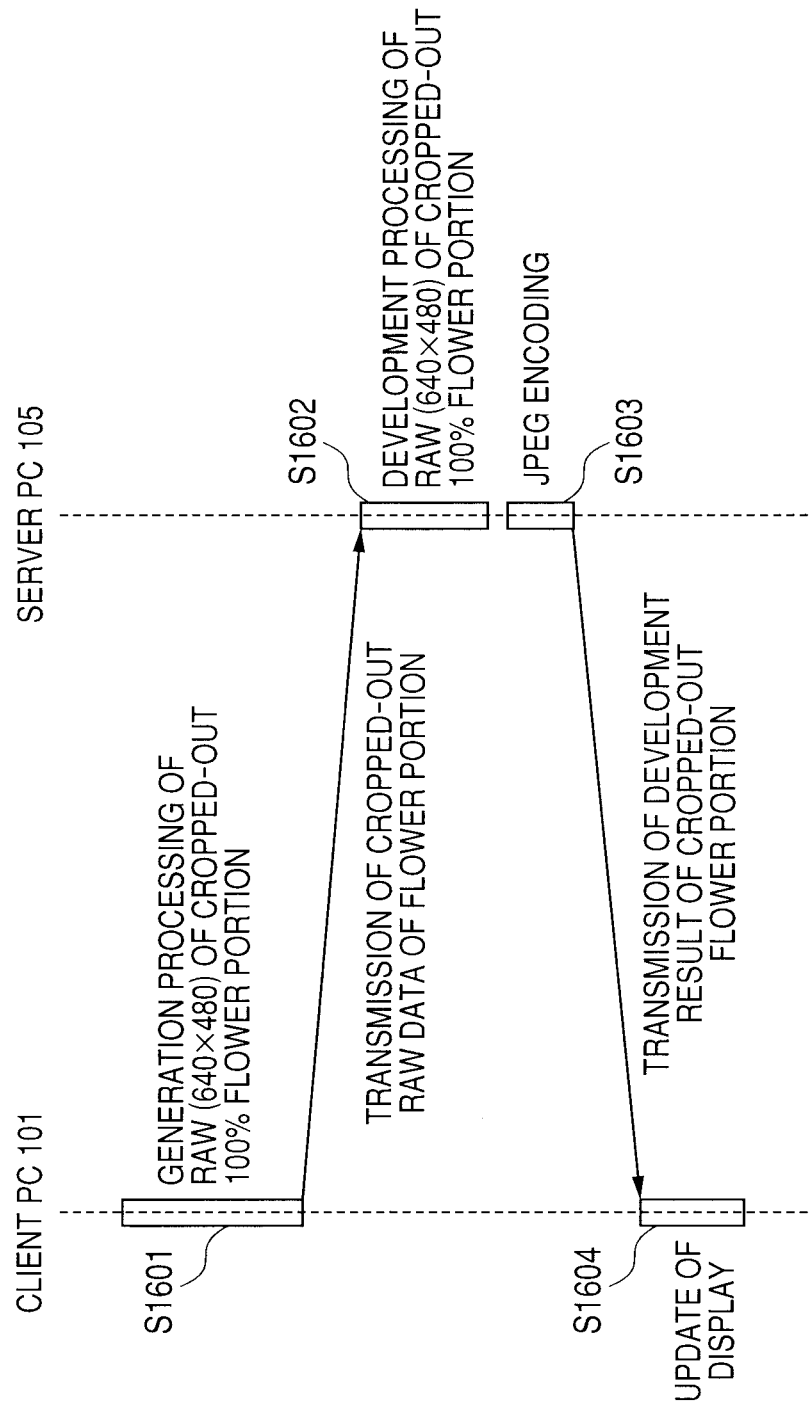

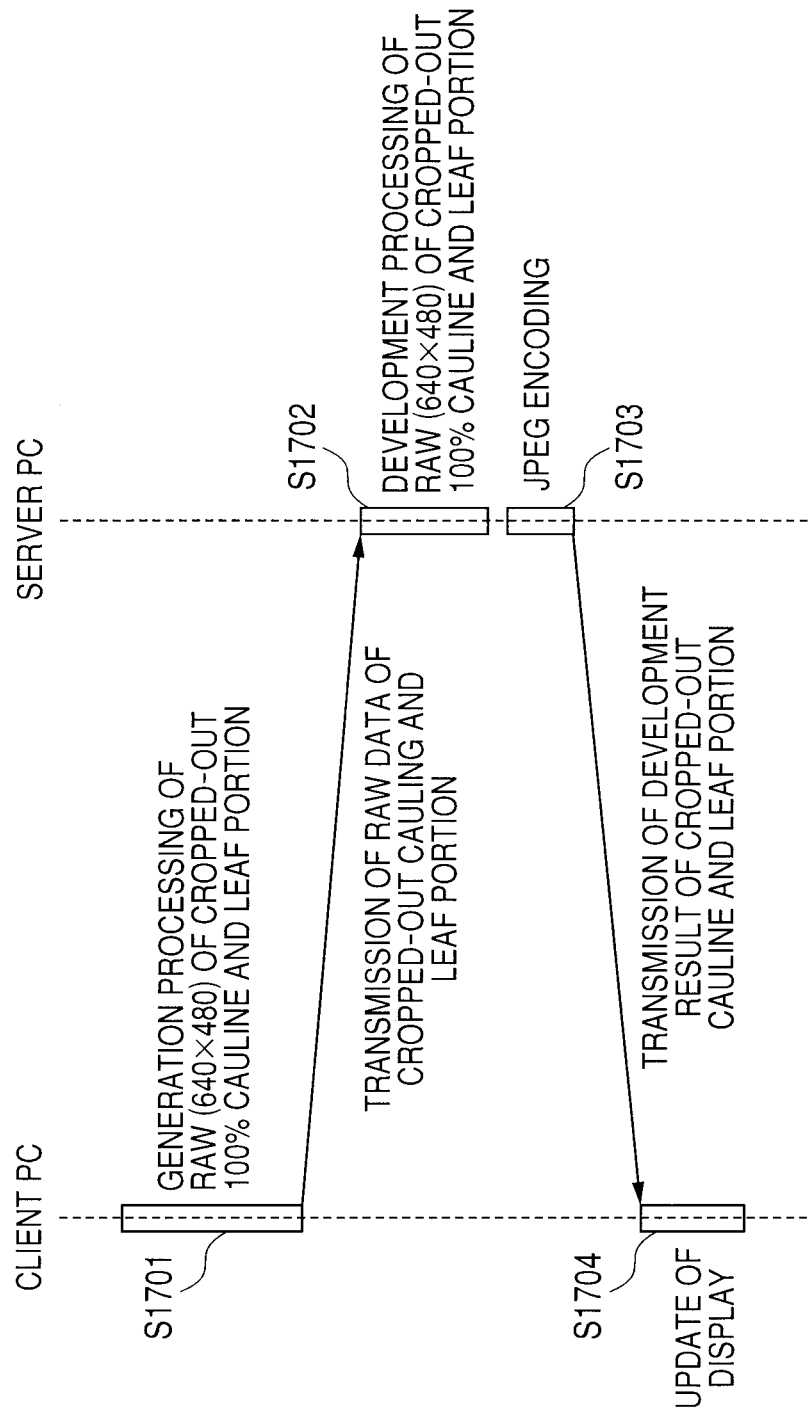

IMAGE PROCESSING SYSTEM

BACKGROUND OF THE INVENTION

1. Field of the Invention

The present invention relates to an image processing system for developing an RAW image.

2. Description of the Related Art

In recent years, when image data is recorded, image data of an RAW format in which data obtained from an image pickup element such as a CCD or CMOS is recorded in a form that is close to an original form of the obtained data, together with data of a general JPEG format has been used. The RAW format is a format that is unique for every digital camera maker.

Therefore, in order to develop the image data of the RAW format, the user needs to install a dedicated software program (development software) which is provided by each maker into an information apparatus. That is, there is such a problem that if the information apparatus has the development software installed therein, the image data (RAW image data) of the RAW format developed and cannot be displayed.

As a measure for solving such a problem, when a client apparatus transmits the RAW image data to a server apparatus through a network, the server apparatus develops the RAW image data and returns image data of a general purpose format to the client. Thus, the client can display and print the data by using the image data returned from the server apparatus.

However, since the RAW image data has a large data size, it takes a long time to transmit the RAW image data from the client apparatus to the server apparatus through the network. At present, in the general RAW image data, a size of image pickup element such as a CCD or CMOS is equal to about 4000 pixels (in the lateral direction) and 3000 pixels (in the vertical direction). When each pixel of the data is converted into digital data by 14 bits and stored, a storage capacity per object is generally equal to about 20 Mbytes although it depends on complexity of the object.

At present, a communication speed of the general network is equal to, for example, about 1 Mbps in the upstream direction. When the RAW image data of 20 Mbytes has been transmitted at the communication speed of 1 Mbps, since 20 Mbytes=160 Mbits, a long time of 160 Mbits/1 Mbits=160 seconds (2 minutes 40 seconds) is required.

Further, when the user wants to develop a large amount of RAW image data, a very long time is expended and usability deteriorates.

SUMMARY OF THE INVENTION

In consideration of the problems in the related art, it is an aspect of the invention to realize a construction in which in the case where an RAW image is transmitted from a client apparatus to a server apparatus and the server apparatus develops RAW image data and transmits the developed data to the client apparatus, a time which is required until the client apparatus displays an RAW development result is reduced, thereby enabling the user to rapidly confirm the development result.

According to one aspect of the present invention, an image processing system is constructed as follows. A client apparatus reduces RAW image data to a size suitable to display, transmits the reduced data to a server apparatus, and requests a development processing. At this time, the client apparatus also starts a transmission processing of original RAW image data to the server apparatus. While adjusting the development processing to the reduced RAW image data, the client apparatus and the server apparatus also execute a transmission and reception processing of the original RAW image data in parallel therewith. After completion of the development processing of the reduced RAW image data, if there is a request from the client apparatus, the server apparatus also soon executes the development processing of the original RAW image data in a manner similar to that in the reduced RAW image data.

Further features of the present invention will become apparent from the following description of exemplary embodiments with reference to the attached drawings.

BRIEF DESCRIPTION OF THE DRAWINGS

FIG. 3 is a block diagram illustrating a construction of a server apparatus according to the embodiment of the invention.

FIG. 17 is a sequence diagram when the user has instructed the equal magnification.

FIG. 19 is a sequence diagram when the user has executed the scroll operation.

DESCRIPTION OF THE EMBODIMENTS

Exemplary embodiments of the present invention will be described hereinbelow with reference to the drawings.

First Embodiment

Construction of Image Processing System

Figure 1:
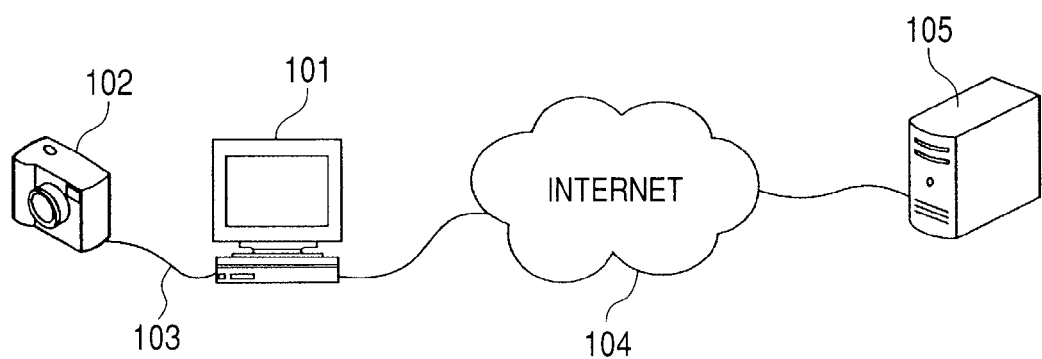
FIG. 1 is a block diagram illustrating a construction of an image processing system according to an embodiment of the invention.

FIG. 1 is a diagram illustrating a schematic construction of an image processing system according to an embodiment of the invention.

As illustrated in FIG. 1, the image processing system has a client apparatus 101, a digital camera 102, and a server apparatus 105. The digital camera 102 is connected to the client apparatus 101 by a USB cable 103. The client apparatus 101 and the server apparatus 105 are connected through an Internet line 104.

The client apparatus 101 may be an apparatus similar to a PC (personal computer) which is generally used at present. It is assumed that the client apparatus 101 has a network card adapter and is connected to the Internet line 104.

The digital camera 102 records a photographed image by an RAW format. The digital camera 102 is connected to the client apparatus 101 by the USB cable 103 and transmits an image file (RAW image file) of the RAW format to the client apparatus 101.

Software for the server to execute an online development service has been installed in the server apparatus 105 and is executed. Although the server apparatus 105 ordinarily has a high-speed CPU and a storage medium of a large capacity in order to execute a large amount of data processings and network communication at a high speed, its hardware construction may be a construction similar to the client apparatus 101.

Internal Constructions of Client Apparatus 101 and Server Apparatus 105

Figure 2:
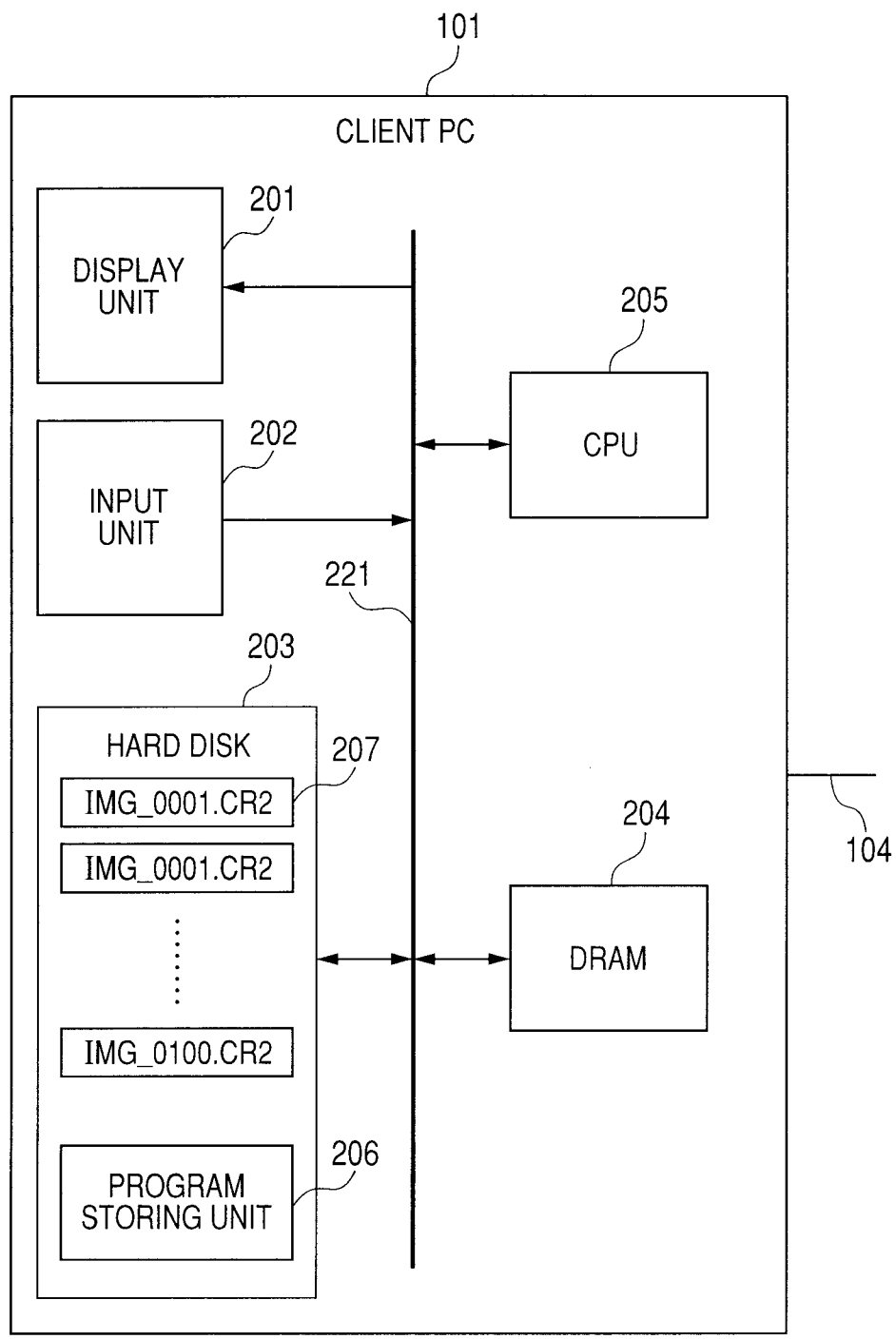
FIG. 2 is a block diagram illustrating a construction of a client apparatus according to the embodiment of the invention.

First, FIG. 2 is a block diagram illustrating an internal construction of the client apparatus 101.

The client apparatus 101 has a display unit 201 constructed by a liquid crystal display or the like, an input unit 202 constructed by a mouse and a keyboard, a hard disk 203 serving as a nonvolatile storage medium, a DRAM 204 serving as a volatile storage medium, and a CPU 205 serving as a central processing unit. They are connected to an internal bus 221.

The internal bus 221 is a bus for directly or indirectly connecting the display unit 201, input unit 202, hard disk 203, CPU 205, DRAM 204, Internet line 104, and other units (not shown), thereby enabling them to mutually perform data transmission and reception.

The hard disk 203 stores an operating system (OS), a program, and the RAW image file. The program is used to make the client apparatus 101 operative as a client apparatus of the image processing system. The CPU 205 reads out the program from the hard disk 203, stores it into the DRAM 204, and sequentially executes it, thereby realizing functions and processings, which will be described hereinafter.

The RAW image file is a file which was photographed by the digital camera 102 and received therefrom. By the operating system, the CPU 205 manages, on a file unit basis, the RAW image data formed every photographing.

The DRAM 204 stores the foregoing program and RAW image file, original image data (original RAW image data) serving as a substance of the image data of the RAW image file, reduced RAW image data, an original RAW development result, a reduced RAW development result, development conditions, and an original RAW transmission flag.

The necessary program is read out from the program in the hard disk 203 and stored in the DRAM 204. The RAW image file selected by the user through the input unit 202 is read out from the RAW image files in the hard disk 203 and stored in the DRAM 204.

A contrast=0 and a brightness=0 are stored in the DRAM 204 as initial values of the development conditions. When the user has changed the development conditions through the input unit 202, they are updated to the changed values and stored. The development conditions are a set of picture quality adjustment parameters which are used when developing the RAW image data. In the embodiment, it is assumed that with respect to the contrast and brightness, adjustment values of 11 levels in a range from −5 to +5 can be designated.

As an initial value of the original RAW transmission flag, "0" indicating not-completion is stored in the DRAM 204. When the transmission to the server apparatus 105 is completed with respect to all of the RAW image files as selection subjects, the value is updated to "1" indicative of completion of the transmission and stored.

As processings of the PC, the CPU 205 makes control of fundamental processings such as file IO, memory IO, display processing to the display unit 201, image processing, user input acceptance processing from the input unit 202, and transmission and reception processing of commands and data to/from the server apparatus 105 through the Internet line 104. The CPU 205 also controls each processing order and executes other processings which are necessary at present in the general PC.

Subsequently, an internal construction of the server apparatus 105 will be described with reference to FIG. 3. FIG. 3 is a block diagram illustrating in detail the internal construction of the server apparatus 105.

The server apparatus 105 has a hard disk 222 serving as a nonvolatile storage medium, a DRAM 239 serving as a volatile storage medium, and a CPU 224 serving as a central processing unit. They are connected to an internal bus 243.

The internal bus 243 is a bus for directly or indirectly connecting the hard disk 222, CPU 224, DRAM 239, Internet line 104, and other units (not shown), thereby enabling them to mutually perform data transmission and reception.

The operating system (OS) and a program for making the server apparatus 105 operative as a server apparatus 105 of the image processing system have been stored in the hard disk 222. The CPU 224 reads out the program from the hard disk 222, stores it into the DRAM 239, and sequentially executes it, thereby realizing functions and processings, which will be described hereinafter.

The DRAM 239 stores the foregoing program and original RAW image data, reduced RAW image data, original RAW development result, reduced RAW development result, and an original RAW data reception completion flag, which will be described hereinafter.

The necessary program is read out from the programs in the hard disk 222 and stored in the DRAM 239. The original RAW image data and reduced RAW image data received from the client apparatus 101 through the Internet line 104 is stored in the DRAM 239.

As an initial value of the original RAW reception completion flag, "0" indicating not-completion is stored in the DRAM 239. When the reception of the original RAW image data is completed, the value is updated to "1" indicative of completion of the reception and stored.

The CPU 224 makes control of the file IO, memory IO, image processing, transmission and reception processing of the commands and data to/from the server apparatus 105 through the Internet line 104, and fundamental processings as processings of the PC. The CPU 224 controls each processing order and executes other processings which are necessary at present in the general PC.

Processing Procedure of Client Apparatus 101

Figure 5:
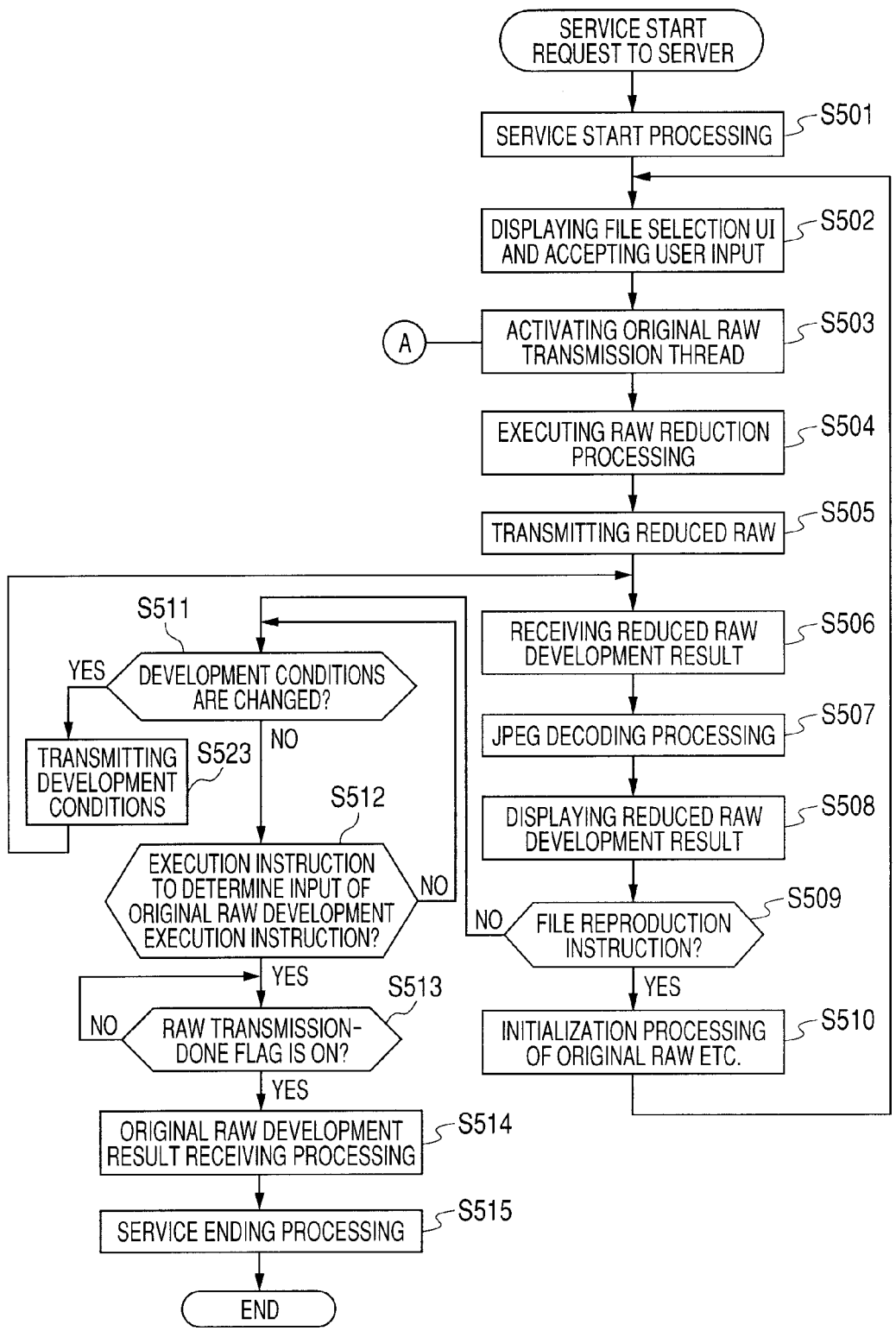
FIG. 5 is a flowchart illustrating a processing procedure of the client apparatus according to the embodiment of the invention.

Subsequently, a processing procedure of the client apparatus 101 according to the embodiment will be described with reference to flowcharts of FIGS. 5 and 6.

First, in step S501, when the user operates the client apparatus 101 and designates a URL of the server apparatus 105, the CPU 205 accesses the server apparatus 105 through the Internet line 104 and requests a development service. At this time, the CPU 205 also transmits information such as user account and password necessary for the development service to the server apparatus 105.

Subsequently, in step S502, in response to the operation of the user, the CPU 205 selects the RAW image file as a development processing subject from a plurality of RAW image files existing in the hard disk 203.

Since software for developing the RAW image file and converting into a file of a display-possible format is not installed in the client apparatus 101, the user presumes the image contents from attribute information such as file name and photographing time and date and selects the RAW image file. Therefore, since a possibility that the user erroneously selects the RAW image file is high, in order to reduce try and error of the selecting operation, it is necessary to promptly display the image so that the contents can be easily understood.

In step S503, the CPU 205 communicates with the server apparatus 105 and executes a negotiation processing. After completion of the negotiation processing, the CPU 205 activates an original RAW transmission thread adapted to transmit the original RAW image data. "Thread" used here is similar to that in the present general operating system and is an execution unit of a parallel processing smaller than the process upon execution of the program. Hereinafter, the CPU 205 executes an original RAW transmission thread processing under a background of a main thread processing. In the main thread, the CPU 205 progresses a processing routine to step S504. In the original RAW transmission thread, the processing routine advances to processings illustrated in the flowchart of FIG. 6, which will be described hereinafter.

In the negotiation processing in S503, the CPU 205 also transmits and receives information necessary for a reduction processing of the original RAW image data. At the time of the negotiation with the server apparatus 105, the CPU 205 transmits data in a header portion of the RAW image file serving as a development processing subject to the server apparatus 105. The server apparatus 105 analyzes the data in the header portion and obtains a detailed format and information for specifying an apparatus type of the digital camera 102. A decoder program and the reduction processing program corresponding to the relevant format and apparatus type are transmitted to the client apparatus 101. In the embodiment, although the server apparatus 105 transmits only the decoder program and reduction processing program corresponding to the relevant format and apparatus type to the client apparatus 101, the invention is not limited to such an example. For example, the server apparatus 105 preliminarily transmits decoder programs and the reduced processing programs corresponding to all formats which are supported and the apparatus types to the client apparatus 101. The CPU 205 may selectively use the program according to the format of the RAW image file and the apparatus type.

Figures 4A, 4B:
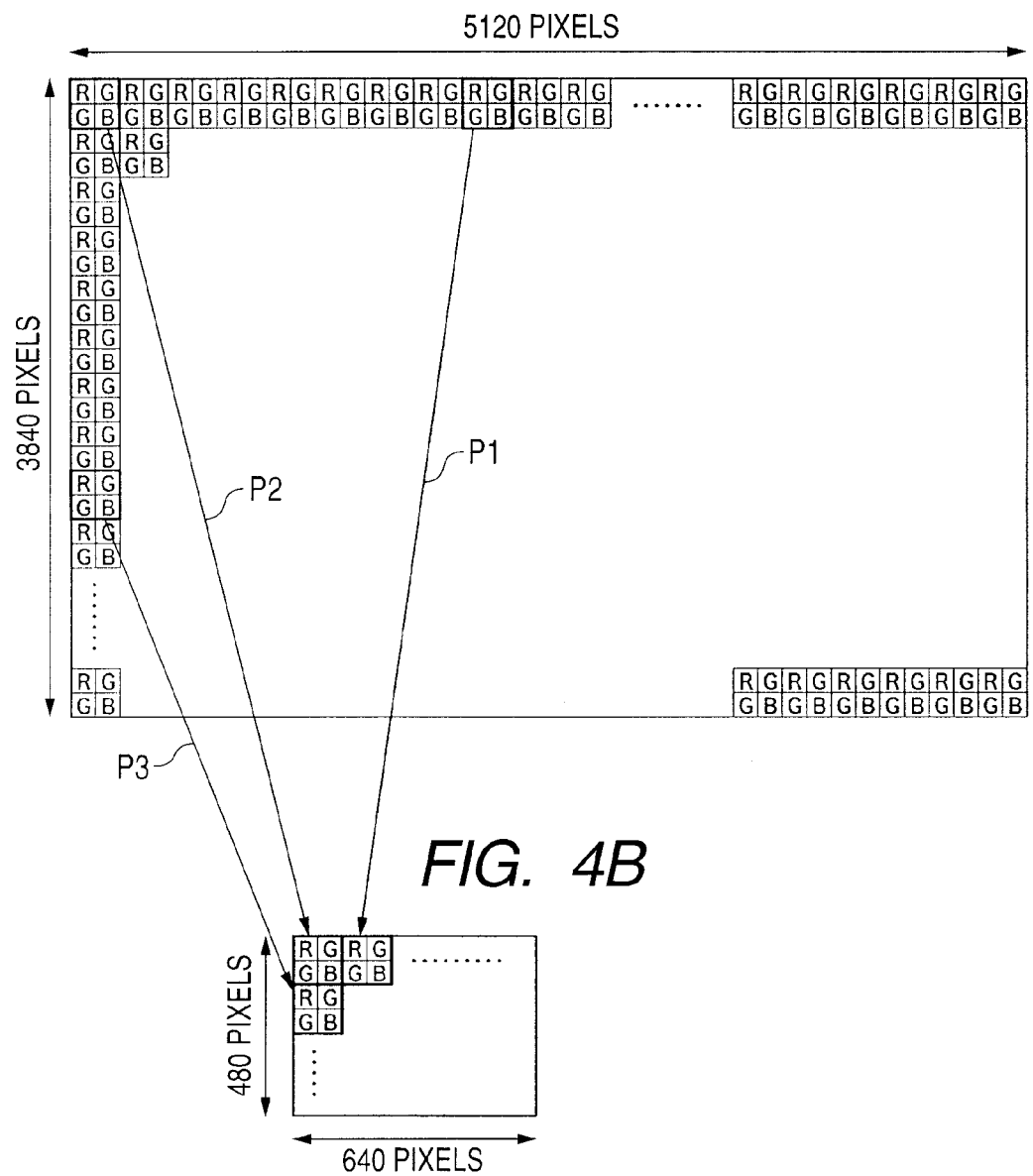
FIGS. 4A and 4B are diagrams illustrating RAW image data according to the embodiment of the invention.
Figure 9:
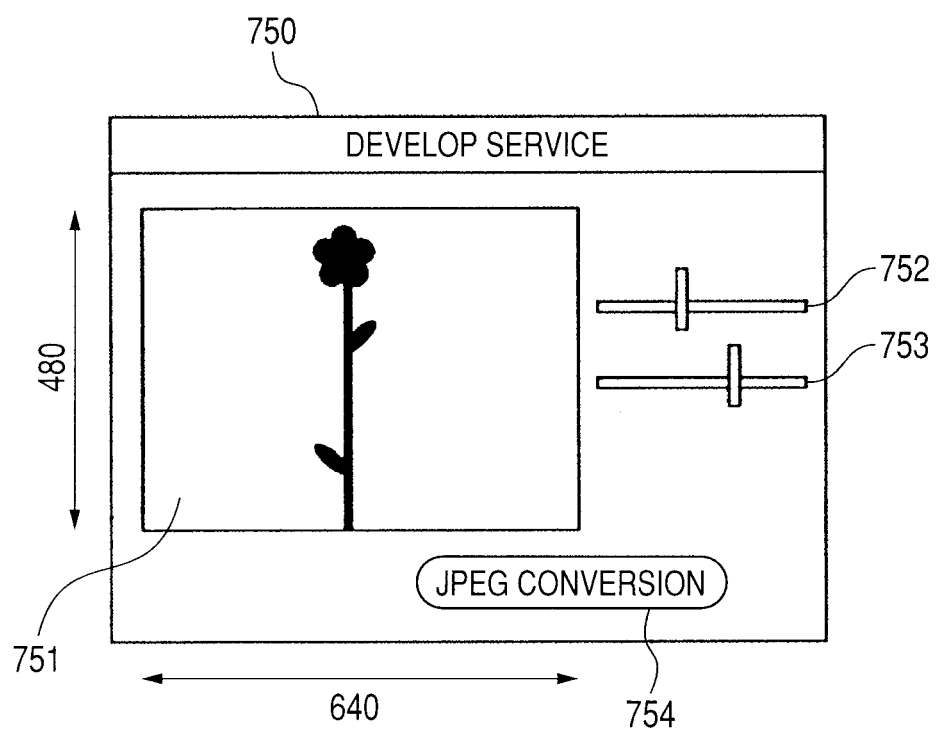
FIG. 9 is a diagram illustrating an image display window according to the embodiment of the invention.

In step S504, the CPU 205 executes a reduction processing of the original RAW image according to the decoder format and the reduction processing program obtained in the negotiation processing in step S503. In the embodiment, it is assumed that a size of image display area 751 of an image display window 750 as illustrated in FIG. 9 in the display unit 201 is equal to 640 pixels (in the lateral direction) and 480 pixels (in the vertical direction) (hereinbelow, the size is simply expressed by 640×480). It is assumed that the original RAW image data has a size of 5120 pixels (in the lateral direction) and 3840 pixels (in the vertical direction) in a Bayer array constructed by components of R (red), G (green), and B (blue) as illustrated in FIG. 4A. The CPU 205 detects the display size of the image display area and forms reduced RAW image data by reducing the original RAW image data according to the display size. That is, the original RAW image data as illustrated in FIG. 4A is thinned out into ⅛ in each of the lateral direction and the vertical direction, thereby forming reduced RAW image data of 640 pixels (in the lateral direction) and 480 pixels (in the vertical direction) as illustrated in FIG. 4B. Since the original RAW image data is reduced to the size of ⅛ in each of the lateral and vertical directions, the size of reduced RAW image data is decreased to 1/64 of the size of original RAW image data. The CPU 205 stores the formed reduced RAW image data into the hard disk 203.

In the reduction processing in the embodiment, it is assumed that as shown by arrows P1, P2, and P3 in FIGS. 4A and 4B, the adjacent R, G, G, and B pixels are handled as one block so that an adjacent pattern in the Bayer array is not disturbed, and the thinning-out processing is executed on a block unit basis.

Subsequently, in step S505, the CPU 205 transmits the reduced RAW image data of the 640×480 size stored in the hard disk 203 to the server apparatus 105 through the Internet line 104.

After that, in step S506, the CPU 205 receives a development result of the reduced RAW image data transmitted to the server apparatus 105 in step S505, from the server apparatus 105 and stores it into the hard disk 203.

In the embodiment, the development result of the reduced RAW image data has been compressed by a JPEG format in the server apparatus 105. Therefore, in step S507, the CPU 205 executes a JPEG decoding processing to the reduced RAW image data. In step S508, the CPU 205 displays the development result of the reduced RAW image data to which the decoding processing has been performed into the image display area 751 of the display unit 201.

At this point of time, the user can confirm the image contents in the RAW image file selected in step S502 on the display unit 201. Therefore, even if the user erroneously selected the RAW image file, he can be aware of it.

In step S509, the CPU 205 discriminates whether or not the user has input a file reselection command through the input unit 202. If the RAW image file displayed in step S508 is not the image which the user intends, the user can input the file reselection command by operating the input unit 202. If YES in step S509, the CPU 205 executes a reset processing of an original RAW transmission thread in step S510. After that, the processing routine is returned to step S502.

In the reset processing of the original RAW transmission thread in step S510, the CPU 205 initializes the original RAW transmission flag in the DRAM 204 to "0", sends a selected RAW change notification to the server apparatus 105, and thereafter, finishes the original RAW transmission thread.

If NO in step S509, in step S511, the CPU 205 reads out, from the DRAM 204, the development conditions used at the time of the development processing of the reduced RAW development result which is being displayed at present and development conditions which were newly input and discriminates whether or not the development conditions have been changed. In the embodiment, the user can input two adjustment items of the contrast and brightness as development conditions by operating a slider control through the input unit 202. If YES in step S511, in step S523, the CPU 205 transmits the development conditions to the server apparatus 105 and, thereafter, returns the processing routine to step S506.

For example, when the development conditions used at the time of the development processing of the reduced RAW development result which is being displayed at present in the display unit 201 are equal to <contrast=0, brightness=0> and the development conditions which were newly input are equal to <contrast=2, brightness=1>, it is determined that the development conditions have been changed.

If the development conditions which were newly input are also equal to <contrast=0, brightness=0>, it is determined that the development conditions are not changed.

In step S512, the CPU 205 discriminates whether or not an instruction to execute the development of the original RAW image has been input in response to the operation of the user. When the user satisfies the reduced RAW development result, he inputs the execution instruction of the development processing of the original RAW image data through the input unit 202. In response to it, the CPU 205 issues the execution instruction to the server apparatus 105. If NO in step S512, the CPU 205 returns the processing routine to step S511.

If YES in step S512, step S513 follows and the CPU 205 discriminates whether or not the transmission of the original RAW image data to the server apparatus 105 has been completed, with reference to the original RAW transmission flag in the DRAM 204. If a value of the original RAW transmission flag is equal to "1" in step S513, the CPU 205 determines that the transmission of the original RAW image data has been all completed. After that, in step S514, the CPU 205 receives the development result of the original RAW image data from the server apparatus 105 and stores into the hard disk 203. After completion of the reception of the development result of all of the original RAW image data, the CPU 205 executes a service ending processing with the server apparatus 105 in step S515 and, thereafter, finishes the present processing procedure. After that, the CPU 205 reads out the development result of the original RAW image data from the hard disk 203, executes a JPEG decoding processing, and displays a processing result to the display unit 201.

Subsequently, a processing procedure of the original RAW image transmission thread activated by the CPU 205 in step S503 will be described with reference to the flowchart of FIG. 6.

Figure 6:
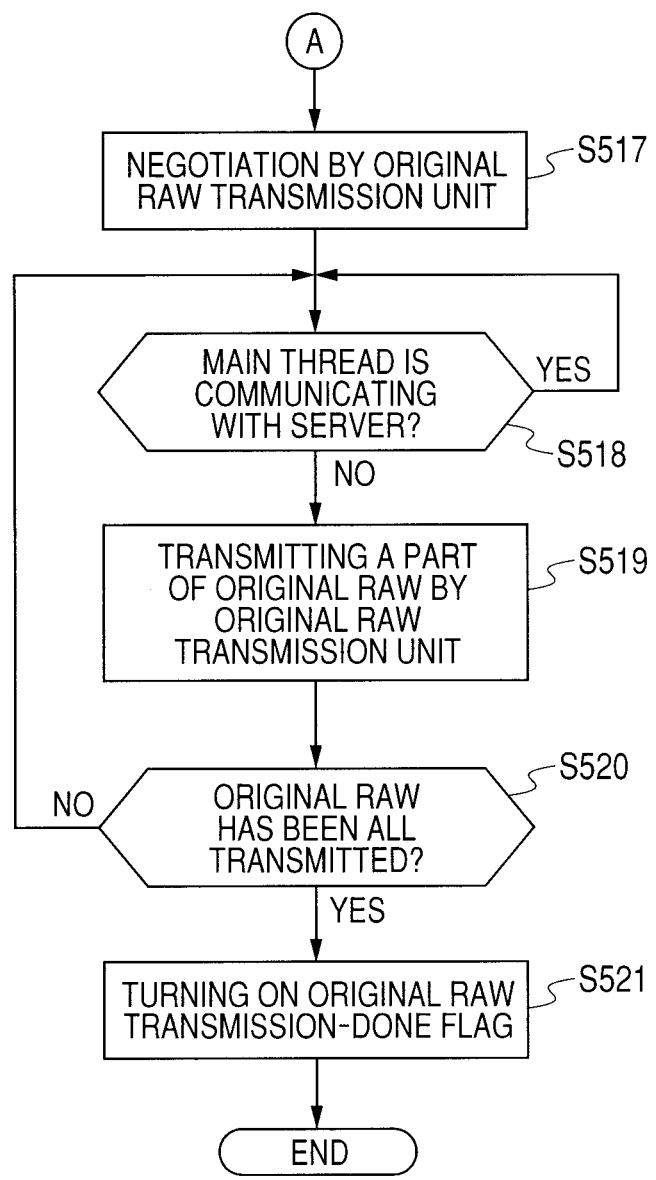
FIG. 6 is a flowchart illustrating the processing procedure of the client apparatus according to the embodiment of the invention.

The CPU 205 executes processings of the original RAW transmission thread after step S517 in FIG. 6 in parallel with the foregoing main thread. In the parallel processings in a PC of a present general single CPU, the processings are not actually executed in parallel. The CPU 205 finely executes the processings of each thread in order according to the operating system. The parallel processings in the embodiment may be similar to them.

In step S517, the CPU 205 negotiates with the server apparatus 105 and notifies the server apparatus 105 that the transmission of the original RAW image data is started. In step S518, the CPU 205 discriminates whether or not the main thread is executing the data transmission and reception to/from the server apparatus 105. If the main thread is transmitting and receiving the data to/from the server apparatus 105, the discrimination in step S518 is made again after the elapse of a predetermined waiting time.

If the main thread is not transmitting and receiving the data to/from the server apparatus 105, the CPU 205 divides the original RAW image data into small units and transmits to the server apparatus 105.

As mentioned above, in the embodiment, network resources (bands) are preferentially allocated to the transmission and reception of the reduced RAW image data and the reduced RAW development result by the main thread. Thus, even if the original RAW image data has already been transmitted by the background, a display response speed and a display updating response speed of the reduced RAW image data are improved. By dividing the original RAW image data into the small units and transmitting every portion in step S519, a data amount in the transmission and reception decreases and a load which is applied to the transmission and reception processing or the image processing for displaying is reduced.

Subsequently, in step S520, the CPU 205 discriminates whether or not the transmission of all of the original RAW image data to the server apparatus 105 has been finished. If the data which is not transmitted yet exists, a discrimination result in step S520 is NO and the CPU 205 returns the processing routine to step S518. When the transmission of all of the original RAW image data to the server apparatus 105 is finished, the discrimination result in step S520 is YES. In step S521, the CPU 205 updates the original RAW transmission flag in the DRAM 204 to "1" and, thereafter, finishes the processing of the original RAW transmission thread.

Processing Procedure of server Apparatus 105

Figure 7:
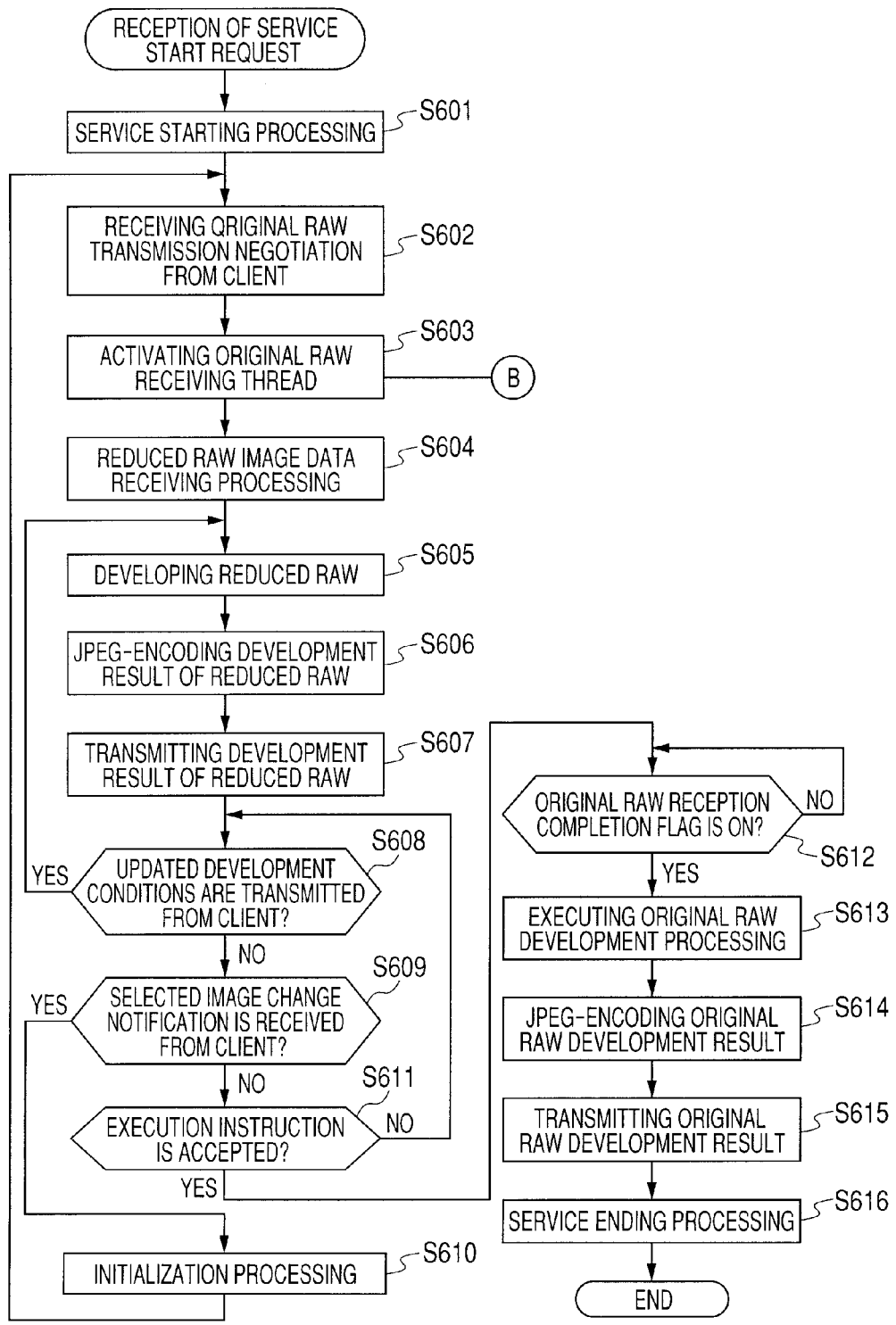
FIG. 7 is a flowchart illustrating a processing procedure of the server apparatus according to the embodiment of the invention.
Figure 8:
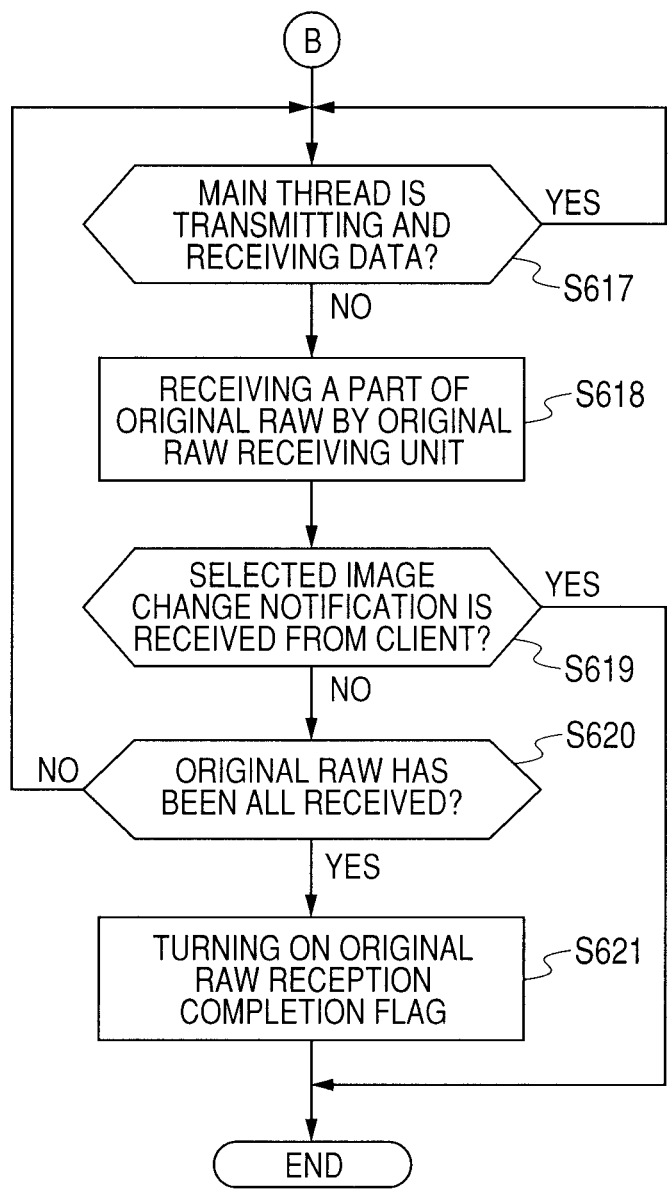
FIG. 8 is a flowchart illustrating the processing procedure of the server apparatus according to the embodiment of the invention.

Subsequently, a processing procedure of the server apparatus 105 according to the embodiment will be described with reference to flowcharts of FIGS. 7 and 8.

In step S601, the CPU 224 receives a request for the development service and information necessary for the development service from the client apparatus 101 and executes a starting processing of the development service. In the starting processing of the development service, the server apparatus 105 makes authentication or the like of the user of the client apparatus 101 and executes an initialization processing of an original RAW reception completion flag, and the like.

Subsequently, in step S602, the CPU 224 executes a processing for negotiating with the client apparatus 101. After completion of the negotiation processing, the CPU 224 activates the original RAW reception thread in step S603. The CPU 224 executes an original RAW receiving thread processing by the background of the main thread processing. In the main thread, the CPU 224 progresses the processing routine to step S604. In the original RAW receiving thread, the processing routine advances to processings illustrated in the flowchart of FIG. 8, which will be described hereinafter.

In step S604, the CPU 224 receives the reduced RAW image data from the client apparatus 101 and stores it into the hard disk 222. In step S605, the CPU 224 reads out the development conditions from the DRAM 239 for the reduced RAW image data in the hard disk 222, executes the development processing according to the development conditions, and stores a development result into the hard disk 222. It is now assumed that the initial values of the development conditions in the DRAM 239 are set to <contrast=0, brightness=0>.

The CPU 224 compresses the development result of step S605 by the JPEG format in step S606 and transmits the compressed data to the client apparatus 101 in step S607.

In step S608, the CPU 224 discriminates whether or not the updated development conditions have been received from the client apparatus 101. If YES in step S608, the CPU 224 returns the processing routine to step S605. The CPU 224 updates the values in the DRAM 239 based on the adjustment values of the received development conditions and executes the development processing for the RAW reduced image data again by using the updated development conditions.

For example, when the development conditions of <contrast=2, brightness=1> different from the initial values are received from the client apparatus 101, the CPU 224 updates the adjustment values of the development conditions in the DRAM 239 and develops the RAW reduced image data by using the new adjustment values.

If NO in step S608, in step S609, the CPU 224 discriminates whether or not the selected RAW change notification has been received from the client apparatus 101. If YES in step S608, in step S610, the CPU 224 initializes the original RAW reception completion flag and, thereafter, returns the processing routine to step S602.

In next step S611, the CPU 224 discriminates whether or not the execution instruction of the original RAW development has been accepted from the client apparatus 101. If NO in step S611, the CPU 224 returns the processing routine to step S608. If YES in step S611, in step S612, with reference to the original RAW reception completion flag, the CPU 224 discriminates whether or not the reception of all of the original RAW image data has been completed. If NO in step S612, the CPU 224 makes the discrimination of step S612 again after the elapse of the predetermined waiting time. If YES in step S612, in step S613, the CPU 224 reads out the development processing conditions used in step S605 from the DRAM 239, develops the original RAW image data by using the read-out conditions, and stores a development result into the hard disk 222.

In next step S614, the CPU 224 executes a JPEG encoding processing to the development result of the original RAW image data in the hard disk 222. In step S615, the CPU 224 transmits the JPEG-encoded development result of the original RAW image data to the client apparatus 101. When the transmission is completed, the CPU 224 executes the service ending processing in step S616 and, thereafter, finishes the processing of the main thread in the present flow.

Subsequently, in step S603, the processing procedure for the original RAW receiving thread activated by the CPU 224 in step S603 will be described with reference to the flowchart of FIG. 8.

First, in step S617, the CPU 224 discriminates whether or not the main thread is transmitting and receiving the data. If YES in step S617, the CPU 224 makes the discrimination in step S617 again after the elapse of the predetermined waiting time. If NO in step S617, the CPU 224 receives a part of the original RAW image data. In next step S619, the CPU 224 discriminates the presence or absence of the selected RAW change notification from the client apparatus 101. If YES in step S619, since the original RAW image data which is being received at present is the data which is not used, the CPU 224 finishes the original RAW receiving thread.

If NO in step S619, in step S620, the CPU 224 discriminates whether or not all of the original RAW image data has been received. If the reception of all of the original RAW image data has been completed, in step S621, the CPU 224 updates the original RAW reception completion flag to "1" and, thereafter, finishes the original RAW receiving thread. If NO in step S620, the CPU 224 returns the processing routine to step S617.

An example of a time which is required for each processing will be described hereinbelow. The following equations (1) and (2) show data sizes of the original RAW image data and the reduced RAW image data in the case where a bit depth of each pixel is equal to 16 bits (2 bytes), respectively.

Data size of original RAW image data:

$$5120 \times 3840 \times 2 \text{ bytes} = 39{,}321{,}600 \text{ bytes (about 40 Mbytes)} \tag{1}$$

Data size of reduced RAW image data:

$$640 \times 480 \times 2 \text{ bytes} = 614400 \text{ bytes (about 614 kbytes)} \tag{2}$$

The reduction processing of the RAW image data in step S504 is the simple thinning-out processing as mentioned above. The processing contents are a copy in the memory of the data in the memory of 614 kbytes. Such a processing is a processing of a short time of 0.1 second or shorter in the present general PC.

Assuming that the communication speed in the upstream direction of the Internet line 104 is equal to 2 Mbps which is a general speed at present, a time which is required for the transmission processing of the reduced RAW image data in step S505 is equal to about 2.5 seconds as shown by the following equations (3).

Transmission time of reduced RAW image data:

$$614 \text{ kbytes} = 614{,}000 \times 8 \text{ bits} = 4{,}912{,}000 \text{ bits}$$

$$4{,}912{,}000 \text{ bits} \div 2{,}000{,}000 \text{ bps} = 2.456 \text{ sec (about 2.5 seconds)} \tag{3}$$

A time which is required for the transmission processing of the original RAW image data in step S503 is equal to about 160 seconds as shown by the following equations (4).

Transmission time of original RAW image data:

$$40 \text{ Mbytes} = 40{,}000{,}000 \times 8 \text{ bits} = 320{,}000{,}000 \text{ bits}$$

$$320{,}000{,}000 \text{ bits} \div 2{,}000{,}000 \text{ bps} = 160 \text{ sec (about 160 seconds)} \tag{4}$$

A time which is required for the development of the reduced RAW image data in step S605 is equal to about 1 second in the present general development software on the present general PC.

A time which is required for the JPEG encoding/decoding processing in each of steps S507 and S614 is equal to a value on the order of 0.1 second or shorter in the present general PC and can be ignored.

A data size of the reduced RAW development result is equal to about 92 kbytes as shown in the following equations (5). Such a value is a value obtained in the case where the data is 8-bit data of three RGB components and a JPEG compression ratio is set to a general value of about $1/10$.

$$\text{Original data: } 640 \times 480 \times 3 \times 1 = 921{,}600 \text{ bytes}$$

$$\text{After JPEG compression:} = 921{,}600 \text{ bytes} \div 10 = 92{,}160 \text{ bytes (about 92 kbytes)} \tag{5}$$

A time which is required to transmit the reduced RAW development result in step S607 is equal to about 0.14 second as shown by the following equations (6). It is a value in the case where a communication speed in the downstream direction of the Internet line 104 is set to a present general value of about 5 Mbps.

Transmission time of reduced RAW development result:

$$92{,}160 \text{ bytes} \times 8 \text{ bits} = 737{,}280 \text{ bits}$$

$$737{,}280 \text{ bits} \div 5{,}000{,}000 \text{ bps} = 0.14 \text{ sec (about 0.14 second)} \tag{6}$$

Therefore, a time which is required until the image contents are displayed in the image display area 751 in the display unit 201 of the client apparatus 101 after the RAW image file was selected is equal to about 3.64 seconds as shown by the following equations (7).

Transmission time of reduced RAW in step S505=about 2.5 seconds

Development time of reduced RAW in step S605=about 1.0 second

Transmission time of reduced RAW development result in step S607=about 0.14 second Required time in steps S702 to S711:

$$1.5 \text{ sec} + 1.0 \text{ sec} + 0.14 \text{ sec} = 3.64 \text{ sec} \tag{7}$$

A time which is required for transmission of the updated development conditions in step S523 can be ignored because the data to be transmitted is two integer values regarding the contrast and brightness and a data amount is equal to a value on the order of about tends of bytes.

Consequently, a time which is required until the development result to which the changed development conditions have been reflected is displayed in the image display area 751 is equal to about 1.14 seconds as shown by the following equations (8).

Development time of reduced RAW in step S714=about 1.0 second (similar to that in S708)

Transmission time of reduced RAW development result in step S716=about 0.14 second (similar to that in S710)

Required time in steps S712 to S717:

$$1.0 \text{ sec} + 0.14 \text{ sec} = 1.14 \text{ sec} \tag{8}$$

Although the waiting time which is required until the reception of the original RAW image data in step S612 is completed differs depending on the time which is required for the user to execute the adjusting operation of the RAW image data, assuming that the time which is required for the adjusting operation is equal to, for example, about 2 minutes, the waiting time is equal to about 40 seconds as shown by the following equations (9).

$$\begin{aligned}&\text{Reception time of original RAW image}\\&\text{data=transmission time of original RAW image}\\&\text{data-adjusting operation time=160 sec-120}\\&\text{sec=40 sec}\end{aligned} \tag{9}$$

A time which is required for the development processing of the original RAW image data is equal to about 10 seconds in the present general PC.

As mentioned above, according to the embodiment, since the server apparatus 105 receives the reduced RAW image data from the client apparatus 101 before the original RAW image data and executes the development processing, an amount of data which is transmitted and received until the user confirms an outline of the development result is small.

Since the server apparatus 105 develops the reduced RAW image data and provides its result to the client apparatus 101 prior to developing the original RAW image data, the user of the client apparatus 101 can promptly confirm the outline of the development result of the image.

Since the server apparatus 105 receives the reduced RAW image data and receives the original RAW image data from the client apparatus 101 in parallel with the development processing, the user can also execute the development processing of the original RAW image data just after confirming the outline of the development result.

In the embodiment, the CPU 205 of the client apparatus 101 loads each program from the hard disk 203. However, the invention is not limited to such a construction but the CPU 205 may download each program from the server apparatus 105 as a plug-in of the Web browser.

Second Embodiment

In an image processing system in the second embodiment, an enlargement function of the RAW image data displayed in the image display area 751 is provided. By using the enlargement function, the user can also confirm the details of a specific portion in the image. When the user clicks a point in the image display area 751 by a mouse cursor, the client apparatus 101 switches the RAW image data from a ⅛ reduction display to an equal magnification display. A description of portions similar to those in the first embodiment is omitted and a construction which is unique to the second embodiment will be described in detail hereinbelow.

Image Display

A state of an image display according to the embodiment will be described hereinbelow with reference to FIGS. 10A, 10B, 11A, and 11B. FIGS. 10A, 10B, 11A, and 11B are display screen diagrams each illustrating the image display state in the second embodiment.

Figure 10B:
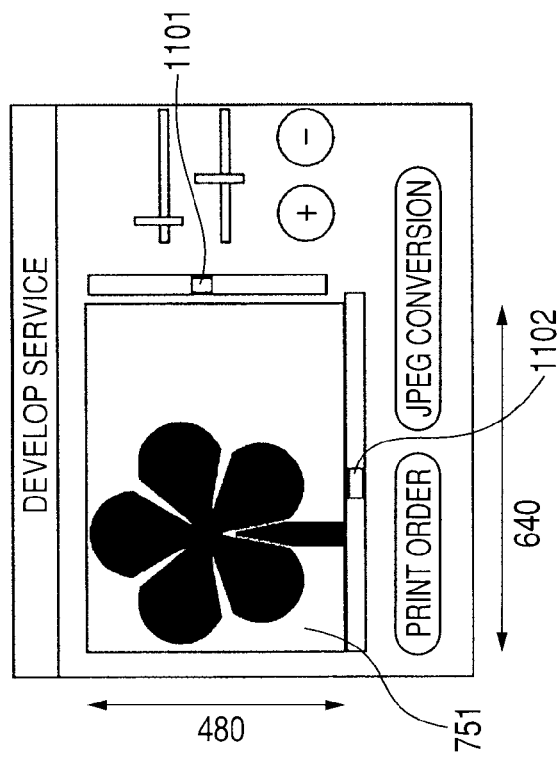
FIGS. 10A and 10B are display screen diagrams each illustrating an image display state in the second embodiment.
Figure 10A:
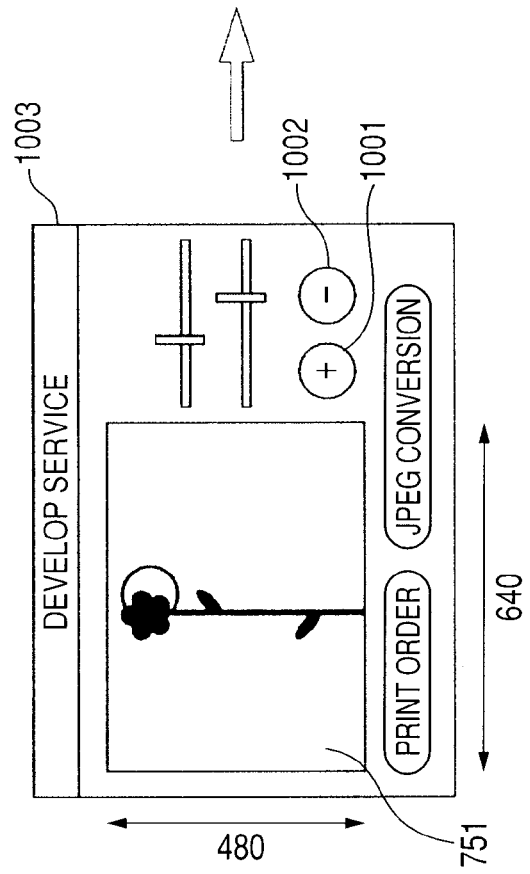

The image display window 750 in the embodiment has an enlargement button 1001 and a reduction button 1002 as illustrated in FIG. 10A. When the user clicks the enlargement button 1001 by the mouse cursor, the mouse cursor changes to an enlargement button mark. When the user clicks a left button of a mouse in this state at an arbitrary position in the image display area 751, the display state is switched to the equal magnification display in which the clicked position is set to a center.

Figure 11A:
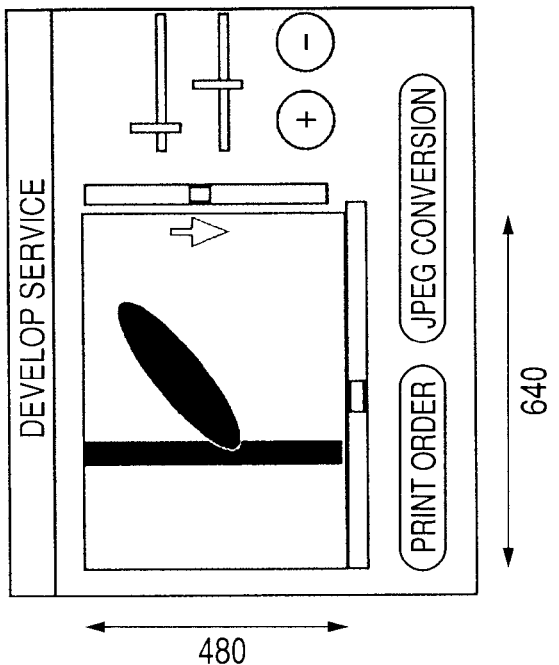
FIGS. 11A and 11B are display screen diagrams each illustrating an image display state in the second embodiment.
Figure 11B:
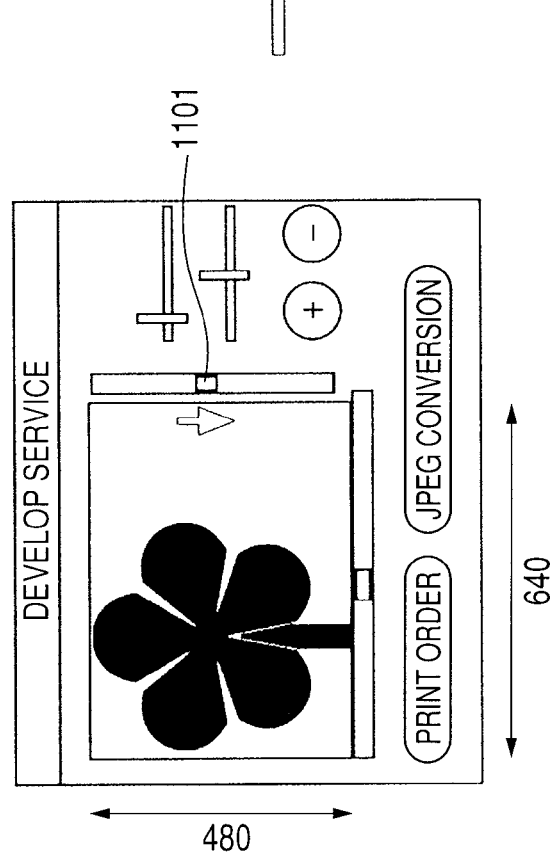

FIG. 10B illustrates a state where after the user clicked a flower portion, the flower portion is displayed at the equal magnification. Areas such as cauline portion and leaf portion which are not displayed exist in this state. Scroll buttons 1101 and 1102 in the diagram are provided to display non-display portions. When the user drags the scroll button 1101 in the lower direction as illustrated in FIG. 11A, the display state of the image display area 751 is changed. FIG. 11B illustrates a state where when the user has scrolled the scroll button 1101 in the lower direction, an area of a leaf existing under the flower is displayed.

Processing Procedure on Client Apparatus 101 Side

Figure 12:
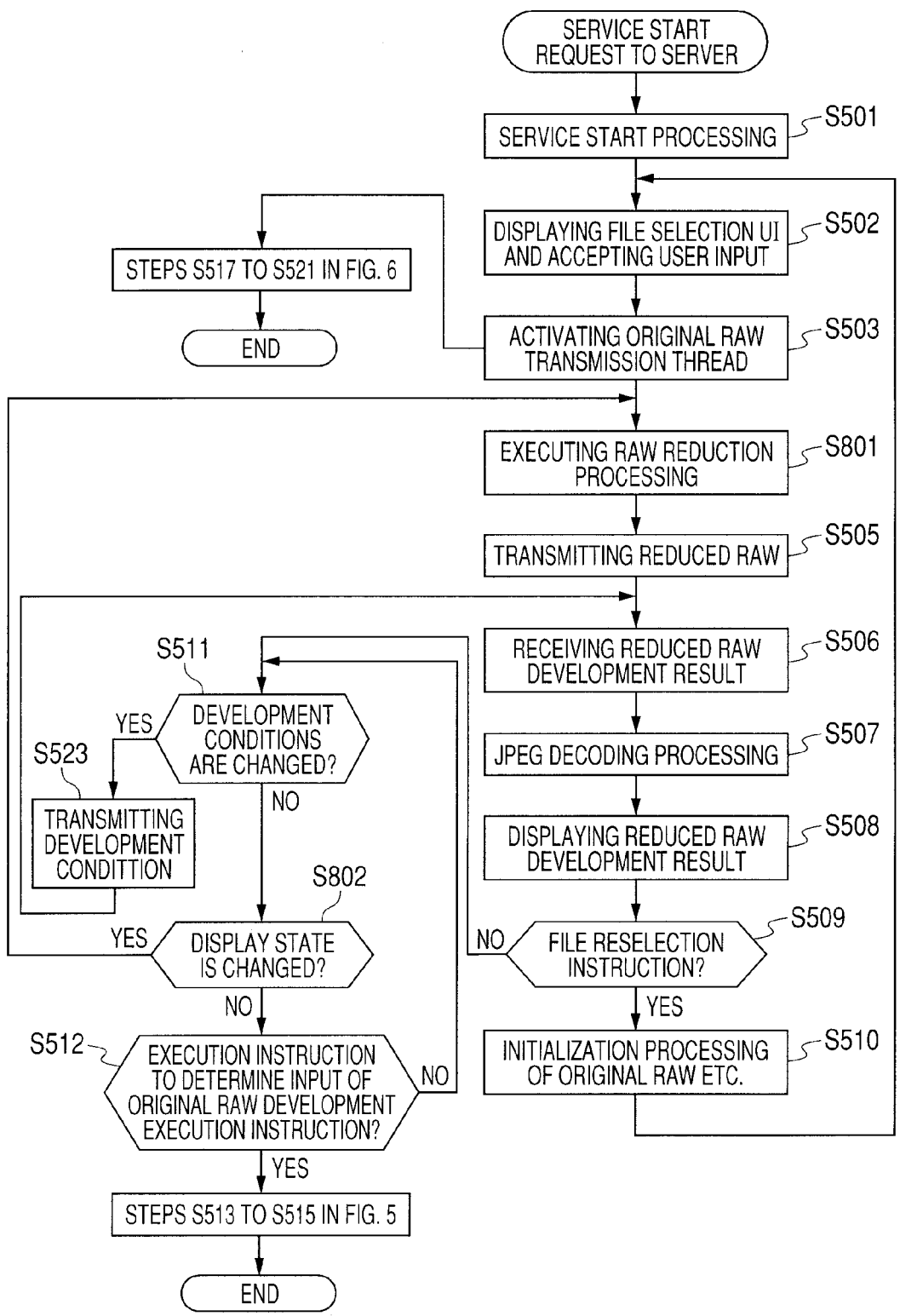
FIG. 12 is a flowchart illustrating a processing procedure on the client apparatus side in the second embodiment.
Figure 13:
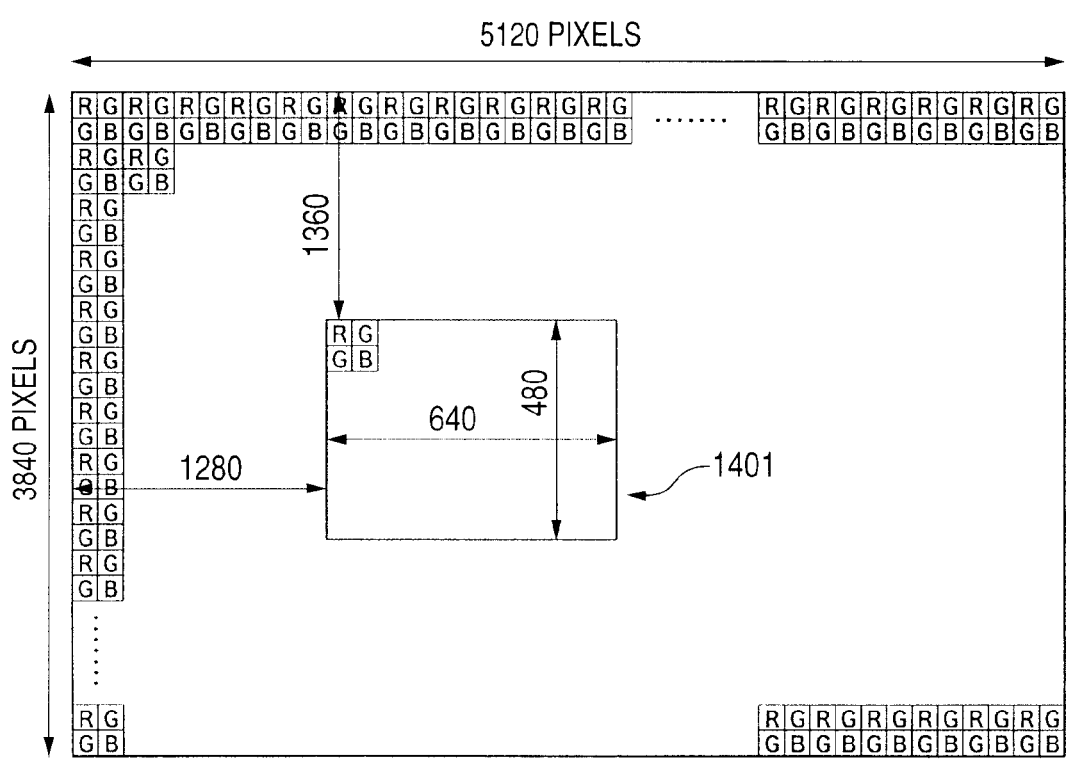
FIG. 13 is a conceptual diagram for describing reduced RAW image data cropped out from original RAW image data.
Figure 14:
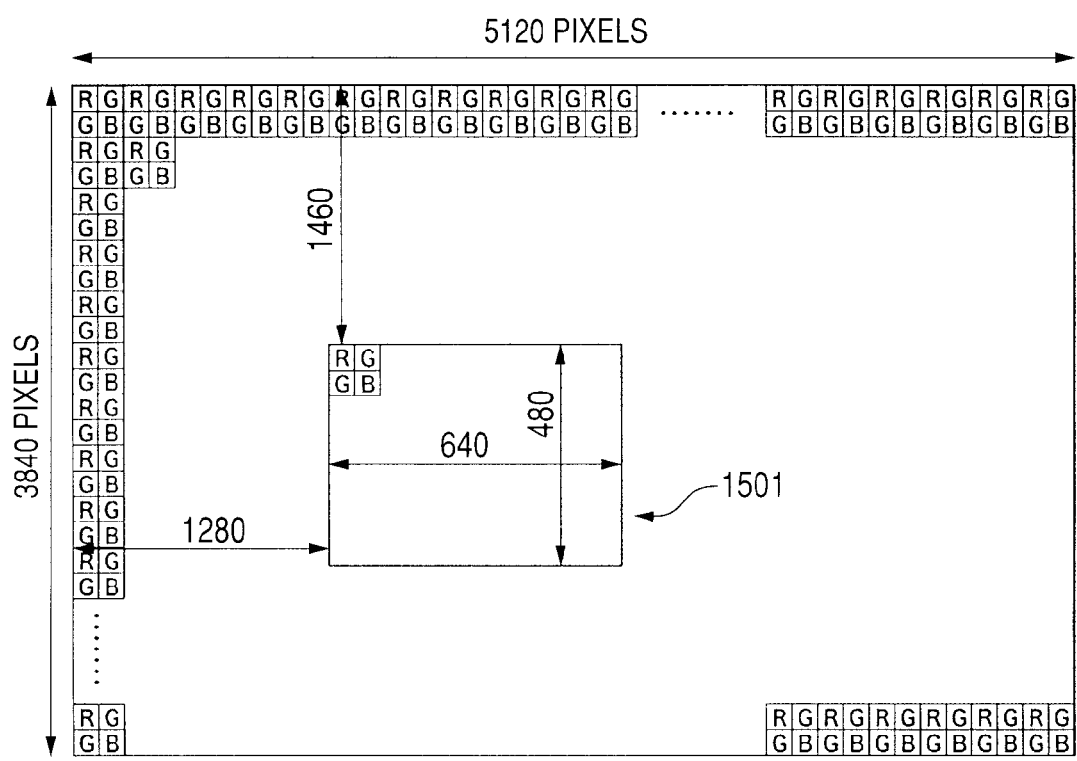
FIG. 14 is a conceptual diagram for describing reduced RAW image data cropped out from the original RAW image data.

Subsequently, a processing procedure on the client apparatus 101 side in the embodiment will be described with reference to FIGS. 12, 13, and 14. FIG. 12 is a flowchart illustrating the processing procedure on the client apparatus 101 side in the embodiment. FIGS. 13 and 14 are conceptual diagrams each for describing the reduced RAW image data cropped out from the original RAW image data.

As illustrated in FIG. 12, the processing procedure of the client apparatus 101 in the embodiment is almost similar to that in the first embodiment and only the procedure of steps S801 and S802 differs.

In step S801, the CPU 205 executes the reduction processing or partial crop-out processing to the original RAW image data according to the state of the image display area 751. When a magnification to be displayed at present indicates the equal magnification display, first, the CPU 205 executes a calculation of a display subject area. For example, assuming that coordinates where the user has clicked the enlargement button 1001 are equal to (X, Y)=(200, 200) while the upper left corner of the image is set to an origin, the display subject area is calculated as follows.

First, the coordinates of the clicked position are converted into an original coordinate system. That is, (200, 200) in the ⅛ coordinate system are increased by eight times and converted into (1600, 1600) in the original coordinate system. The coordinates of each vertex in the display area are calculated as follows. That is, the coordinates of each vertex of the 640×480 size in which the (1600, 1600) coordinates are set to the center are calculated by the following equations (11) to (14).

$$X \text{ coordinate of upper left corner}=1600-(640/2)=1280 \tag{11}$$

$$Y \text{ coordinate of upper left corner}=1600-(480/2)=1360 \tag{12}$$

$$X \text{ coordinate of lower right corner} = 1280+640-1=1919 \qquad (13)$$

$$Y \text{ coordinate of lower right corner} = 1360+480-1=1839 \qquad (14)$$

As illustrated in FIG. 13, in step S801, by using the coordinates calculated as mentioned above, the CPU 205 forms reduced RAW image data cropped out from the original RAW image data. When a magnification to be displayed at present is set to the reduced display of the 640×480 size, a reduction processing similar to that in the first embodiment is executed.

Subsequently, a case where the user executed the scroll operation to the image display area 751 from the state where the equations (11) to (14)=(1280, 1360, 1919, 1839) will be described.

In the embodiment, when the user has moved the scroll button 1101 by a distance of one dot, the area is scrolled by a distance of 20 dots and displayed. In this case, when the user has dragged the scroll button in the lower direction by a distance of 50 dots, this means that the area in the coordinate system of the original RAW image data is shifted downwardly by a distance of 100 pixels. Therefore, the CPU 205 calculates the coordinates of the area by the following equations (15) to (18).

$$X \text{ coordinate of upper left corner} = \text{equation (11)} \qquad (15)$$

$$Y \text{ coordinate of upper left corner} = \text{equation (12)} + 100 = 1460 \qquad (16)$$

$$X \text{ coordinate of lower right corner} = \text{equation (13)} \qquad (17)$$

$$Y \text{ coordinate of lower right corner} = \text{equation (14)} + 100 = 1939 \qquad (18)$$

As illustrated in FIG. 14, in step S801, by using the coordinates calculated as mentioned above, the CPU 205 forms the reduced RAW image data cropped out from the original RAW image data.

In step S802, the CPU 205 discriminates whether or not the user has executed the operation to change the display state such as enlargement, reduction, or scroll through the input unit 202. If the user executed the display state changing operation, the CPU 205 returns the processing routine to step S801 and executes the forming processing of the reduced RAW image data again.

Processing Procedure on Server Apparatus 105 Side in the Second Embodiment

Subsequently, a processing procedure on the server apparatus 105 side in the embodiment will be described with reference to a flowchart of FIG. 15.

Figure 15:
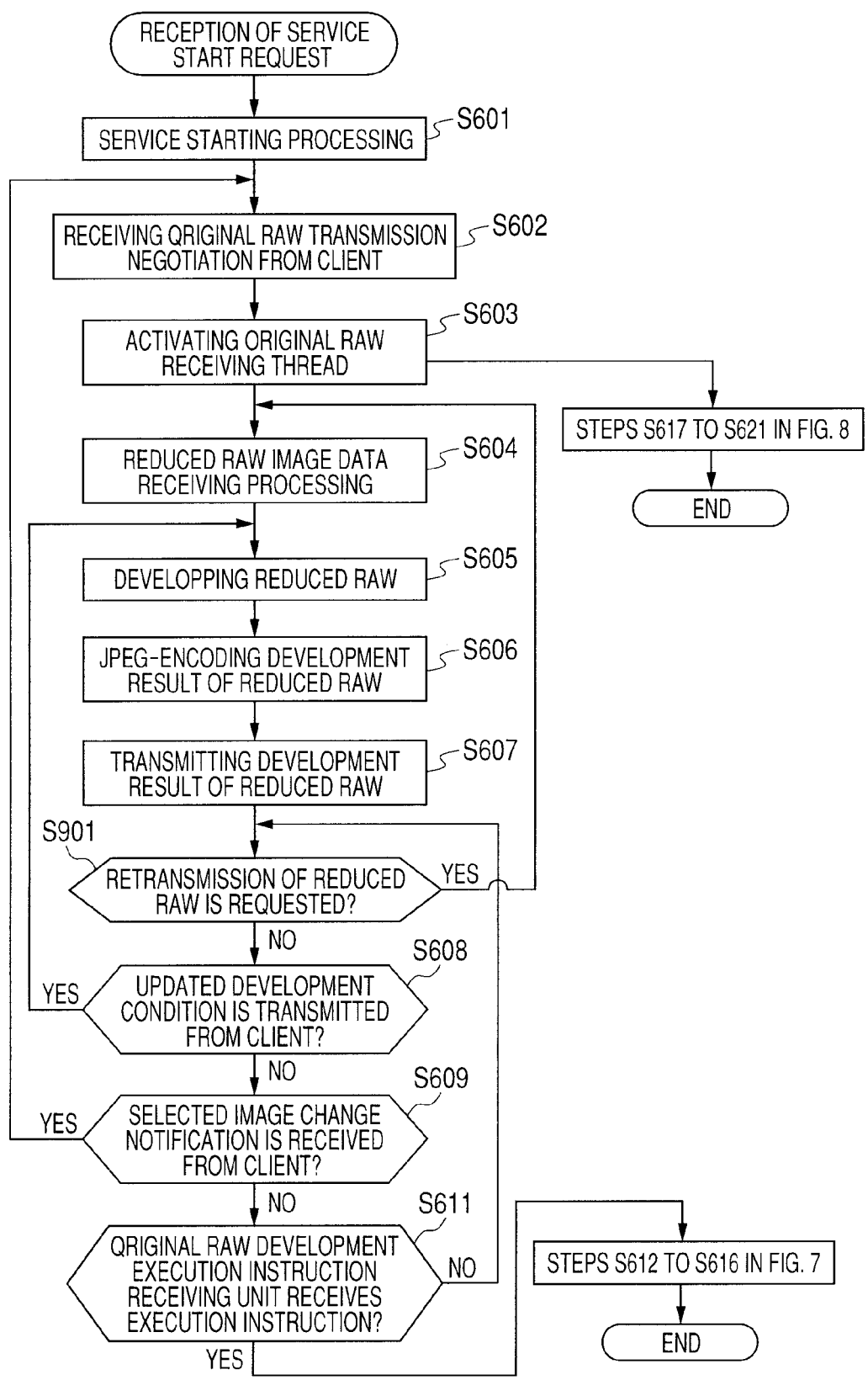
FIG. 15 is a flowchart illustrating a processing procedure on the server apparatus side in the second embodiment.

As illustrated in FIG. 15, the processing procedure of the client apparatus 101 in the embodiment is almost similar to that in the first embodiment and only a procedure of step S901 differs therefrom.

In step S901, the CPU 224 discriminates whether or not there is a retransmission request of the reduced RAW image data from the client apparatus 101. If YES in step S901, the CPU 224 returns the processing routine to step S604 and receives the reduced RAW image data again from the client apparatus 101. If NO in step S901, the CPU 224 progresses the processing routine to step S608.

Sequence of Image Processing System

Subsequently, a sequence of the processing procedure of each of the client apparatus 101 and the server apparatus 105 described by the flowcharts of FIGS. 12 and 15 will be described further in detail.

(A) Sequence When the User has Instructed the Equal Magnification

Figure 16A:
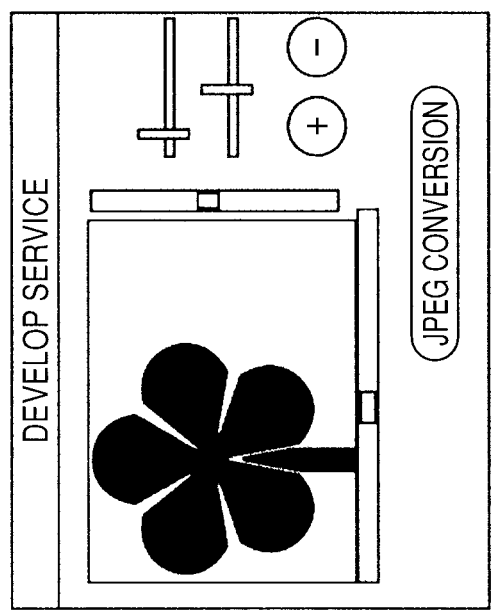
FIGS. 16A and 16B are display screen diagrams each illustrating an image display state when the user has instructed an equal magnification.
Figure 16B:
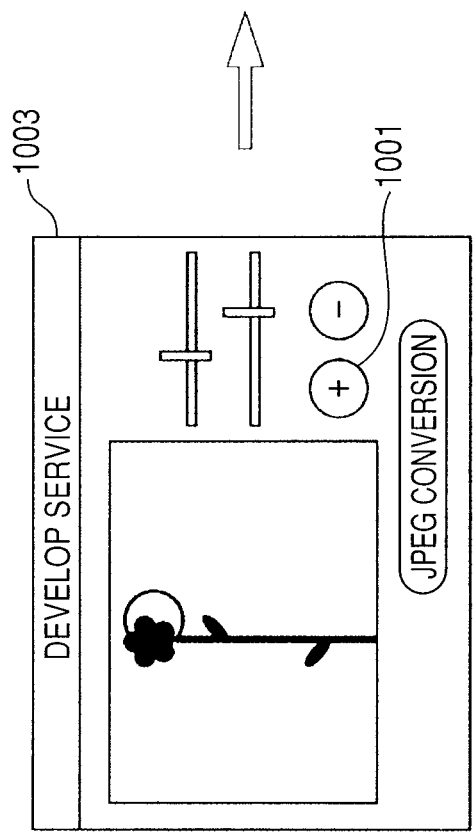

First, a sequence when the user has instructed the equal magnification will be described with reference to FIGS. 16A, 16B, and 17. FIGS. 16A and 16B are display screen diagrams each illustrating the image display state when the user has instructed the equal magnification. FIG. 17 is a sequence diagram at that time.

A case where the user clicked a point on the image display area 751 by the enlargement button 1001 from the reduced display state as illustrated in FIG. 16A will be described. When the user clicks it, the client apparatus 101 calculates a crop-out area of the original RAW image data as shown by the foregoing equations (11) to (14) in step S1601. The user forms reduced RAW image data by executing the crop-out processing of the original RAW image data of the flower portion based on a calculation result and, thereafter, transmits the reduced RAW image data to the server apparatus 105.

When the reduced RAW image data is received from the client apparatus 101, the server apparatus 105 executes the development processing to the reduced RAW image data in step S1602. In step S1603, the server apparatus 105 JPEG-encodes its development result and, thereafter, transmits encoded data to the client apparatus 101.

When the development result is received from the server apparatus 105, in step S1604, the client apparatus 101 updates the display of the image display area 751, thereby setting a state where the flower portion has been displayed at the equal magnification as illustrated in FIG. 16B.

(B) Sequence in the Case Where the User Executed the Scroll Operation

Figure 18A:
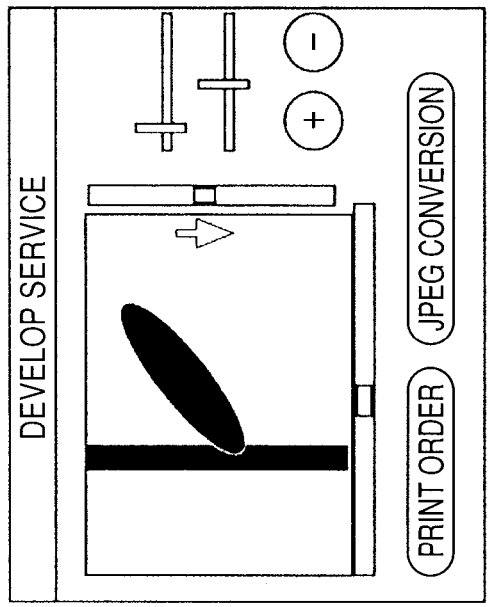
FIGS. 18A and 18B are display screen diagrams each illustrating an image display state when the user has executed a scroll operation.
Figure 18B:
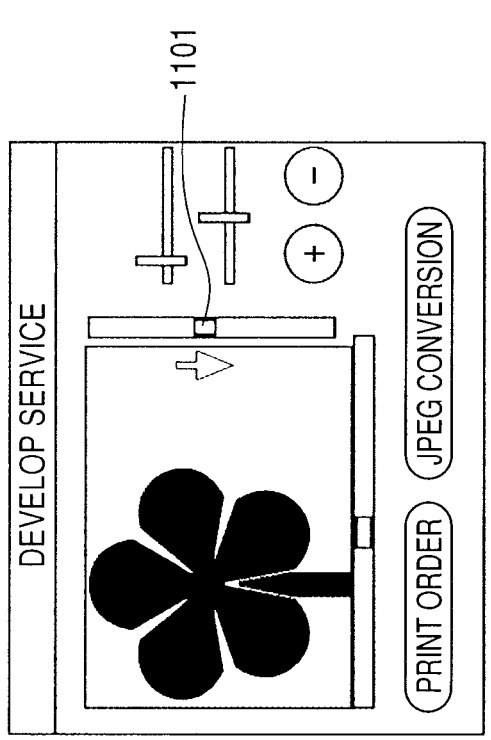

Subsequently, a sequence in the case where the user executed the scroll operation will be described with reference to FIGS. 18A and 18B and 19. FIGS. 18A and 18B are display screen diagrams each illustrating an image display state when the user has executed the scroll operation. FIG. 19 is a sequence diagram at that time.

When the user drags the scroll button 1101 in the lower direction from the display state as illustrated in FIG. 18A, the client apparatus 101 calculates the crop-out area of the original RAW image data as shown by the equations (15) to (18) in step S1701. Subsequently, the CPU forms the reduced RAW image data by executing a crop-out processing of the original RAW image data of a cauline and leaf portion based on a calculation result and, thereafter, transmits the reduced RAW image data to the server apparatus 105.

When the reduced RAW image data is received from the client apparatus 101, the server apparatus 105 develops the reduced RAW image data in step S1702, JPEG-encodes its development result in step S1703, and thereafter, transmits encoded data to the client apparatus 101. When the development result is received from the server apparatus 105, in step S1704, the client apparatus 101 updates the display of the image display area 751, thereby setting a state where the cauline and leaf portion has been displayed at the equal magnification as illustrated in FIG. 18B.

As described above, in the embodiment, in association with the change in image display state such as enlargement, reduction, or scroll which is performed by the user, the client apparatus 101 forms the reduced RAW image data by cropping out the original RAW image data and transmits the reduced RAW image data to the server apparatus 105 again. The server apparatus 105 develops the reduced RAW image data which was retransmitted and transmits the development result to the client apparatus 101. Thus, the user can partially confirm the RAW development result at the equal magnification.

In the equal magnification display mode, the client apparatus 101 executes the crop-out processing to the original RAW image data in consideration of the display area and transmits the least necessary original RAW image data to the server apparatus 105. Therefore, the user can confirm by the high resolution image while maintaining the response speed of the image display updating. This means that in the case where the user needs to confirm the details of a position of an in-focus point, if there is no need to confirm them by the whole image, a desired portion of the user can be displayed at a high speed and high picture quality, so that usability is improved.

Other Embodiments

Aspects of the present invention can also be realized by a computer of a system or apparatus (or device such as a CPU or MPU) that reads out and executes a program recorded on a memory device to perform the functions of the above-described embodiment(s), and by a method, the stops of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-110718, filed Apr. 30, 2009, and No. 2010-068620, filed Mar. 24, 2010 which are hereby incorporated by reference herein in their entirety.

What is claimed is:

1. An image processing system in which a server apparatus and a client apparatus are connected through a network, the client apparatus comprising:
    a reducing unit configured to form a reduced image by reducing an original image;
    a first transmitting unit configured to transmit the reduced image and the original image to the server apparatus in parallel transmission, the first transmitting unit finishing transmitting the reduced image completely before the original image is transmitted completely;
    a first receiving unit configured to receive a result of image processing of the reduced image by the server apparatus from the server apparatus before the original image is transmitted completely by the first transmitting unit;
    a display unit configured to display the received result of the image processing of the reduced image onto a display screen; and
    a second receiving unit configured to receive a result of image processing of the original image after the display unit displays the received result of the image processing of the reduced image; and
    the server apparatus comprising:
    a third receiving unit configured to receive the reduced image and the original image from the client apparatus in parallel transmission, the third receiving unit finishing receiving the reduced image completely before the original image being received completely;
    an image processing unit configured to execute an image processing on the reduced image received from the client apparatus before the original image is received completely by the third receiving unit and to execute the image processing on the original image received completely by using an adjustment value used in the image processing to the reduced image after the original image is received completely by the third receiving unit; and
    a second transmitting unit configured to transmit the result of the image processing of the reduced image executed by the image processing unit to the client apparatus before the original image is received completely by the third receiving unit and to transmit the result of the image processing of the original image to the client apparatus after the original image is received completely by the third receiving unit.

2. A system according to claim 1, wherein the reducing unit reduces the original image according to a display size of the display screen.

3. A system according to claim 1, wherein when there is an instruction to change an area of the image which is displayed on the display screen, the reducing unit forms the reduced image by cropping out a portion corresponding to the area of the original image and the first transmitting unit transmits the cropped reduced image to the server apparatus.

4. A system according to claim 1, wherein the original image is RAW image data and the image processing is a development processing of the RAW image data.

5. A system according to claim 1, further comprising:
    a determination unit configured to determine whether the first transmitting unit has transmitted the original image to the server apparatus completely,
    wherein the second transmitting unit transmits the result of the image processing to the original image to the client apparatus, if the determination unit determines that the first transmitting unit has transmitted the original image to the server apparatus completely.

6. An information processing apparatus for connecting to a server apparatus through a network comprising:
    a reducing unit configured to form a reduced image by reducing an original Image;
    a transmitting unit configured to transmit the reduced image and the original Image to the server apparatus in parallel transmission, the transmitting unit finishing transmitting the reduced Image completely before the original image is transmitted completely;
    a first receiving unit configured to receive a result of image processing of the reduced image by the server apparatus from the server apparatus before the original image is transmitted completely by the transmitting unit; and
    a display unit configured to display the received result of the image processing of the reduced image onto a display screen, wherein before the transmitting unit transmits completely the original image, the display unit displays the result of the image processing of the reduced image received from the server apparatus; and
    a second receiving unit configured to receive a result of image processing of the original image after the display step displays the received result of the image processing of the reduced image.

7. An apparatus according to claim 6, wherein the reducing unit reduces the original image according to a display size of the display screen.

8. An apparatus according to claim 6, wherein when there is an instruction to change an area of the image which is displayed on the display screen, the reducing unit forms the reduced image by cropping out a portion corresponding to the area of the original image.

9. An apparatus according to claim 6, wherein the original image is RAW image data and the image processing is a development processing of the RAW image data.

10. An apparatus according to claim 6, wherein the reducing unit reduces the original image according to predetermined information obtained from the server apparatus.

11. An apparatus according to claim 6, further comprising:
a determination unit configured to determine whether the transmitting unit has transmitted the original image to the server apparatus completely,
wherein the second receiving unit receives the result of the image processing to the original image from the server apparatus, if the determination unit determines that the transmitting unit has transmitted the original image to the server apparatus completely.

12. An image processing apparatus for connecting to a client apparatus through a network comprising:
a receiving unit configured to receive a reduced image and an original image from the client apparatus in parallel transmission, the receiving unit finishing receiving the reduced image completely before the original image being received completely;
an image processing unit configured to execute image processing on the reduced image received from the client apparatus before the original image is received completely by the receiving unit and to execute an image processing on the original image received completely by using an adjustment value used in the image processing to the reduced image after the original image is received completely by the receiving unit; and
a transmitting unit configured to transmit the result of the image processing of the reduced image executed by the image processing unit to the client apparatus before the original image is received completely by the receiving unit and to transmit the result of the image processing of the original image to the client apparatus after the original image is received completely by the receiving unit.

13. An apparatus according to claim 12, wherein the original image is RAW image data and the image processing is a development processing of the RAW image data.

14. A control method of an information processing apparatus for connecting to a server apparatus through a network, comprising:
a reducing step of forming a reduced image by reducing an original image;
a transmitting step of transmitting the reduced image and the original image to the server apparatus in parallel transmission, the transmitting step finishing transmitting the reduced image completely before the original image is transmitted completely;
a first receiving step of receiving a result of the image processing of the reduced image by the server apparatus from the server apparatus before the original image is transmitted completely in the transmitting step;
a display step of displaying the received result of the image processing of the reduced image onto a display screen, wherein before the transmitting step transmits completely the original image, the display step displays the result of the image processing of the reduced image received from the server apparatus; and
a second receiving step of receiving a result of Image processing of the original image after the display step displays the received result of the image processing of the reduced image.

15. A control method of an image processing apparatus for connecting to a client apparatus through a network, comprising:
a receiving step of receiving a reduced image and an original image from the client apparatus in parallel transmission, the receiving step finishing receiving the reduced image completely before the original image being received completely;
an image processing step of executing image processing on the reduced image transmitted received from the client apparatus before the original image is received completely in the receiving step and to execute an image processing on the original image received completely by using an adjustment value used in the image processing to the reduced image after the original image is received completely in the receiving step; and
a transmitting step of transmitting the result of the image processing of the reduced image executed in the image processing step to the client apparatus before the original image is received completely in the receiving step and to transmit the result of the image processing of the original image to the client apparatus after the original image is received completely in the receiving step.

16. A non-transitory computer-readable storage medium storing program code for causing a computer to execute a control method of an information processing apparatus for connecting to a server apparatus through a network, the control method comprising:
a reducing step of forming a reduced image by reducing an original image;
a transmitting step of transmitting the reduced image and the original image to the server apparatus in parallel transmission, the transmitting step finishing transmitting the reduced image completely before the original image is transmitted completely;
a first receiving step of receiving a result of image processing of the reduced image by the server apparatus from the server apparatus before the original image is transmitted completely in the transmitting step;
a display step of displaying the received result of the image processing of the reduced image onto a display screen, wherein before the transmitting step transmits completely the original image, the display step displays the result of the image processing of the reduced image received from the server apparatus; and
a second receiving step of receiving a result of Image processing of the original image after the display step displays the received result of the image processing of the reduced image.

17. A non-transitory computer-readable storage medium storing program code for causing a computer to execute a control method an image processing apparatus for connecting to a client apparatus through a network, the control method comprising:
a receiving step of receiving a reduced image and an original image from the client apparatus in parallel transmission, the receiving step finishing receiving the reduced image completely before the original image being received completely;
an image processing step of executing image processing on the reduced image received from the client apparatus before the original image is received completely in the receiving step and to execute an image processing on the original image received completely by using an adjustment value used in the image processing to the reduced image after the original image is received completely in the receiving step; and
a transmitting step of transmitting the result of the image processing of the reduced image executed in the image processing step to the client apparatus before the original image is received completely in the receiving step and to transmit the result of the image processing of the original image to the client apparatus after the original image is received completely in the receiving step.

* * * * *